United States Patent [19]

Eschenberg

[11] 4,366,258

[45] Dec. 28, 1982

[54] BLAST FURNACE WITH A REFRACTORY LINING OF CONCRETE COMPONENTS

[75] Inventor: Rudolf Eschenberg, Dinslaken, Fed. Rep. of Germany

[73] Assignee: Thyssen Aktiengesellschaft, Duisburg, Fed. Rep. of Germany

[21] Appl. No.: 330,796

[22] Filed: Dec. 15, 1981

Related U.S. Application Data

[63] Continuation-in-part of Ser. No. 261,620, May 7, 1981, abandoned, which is a continuation of Ser. No. 103,426, Dec. 14, 1979, abandoned.

[30] Foreign Application Priority Data

Dec. 20, 1978 [DE] Fed. Rep. of Germany ........ 2854998

[51] Int. Cl.$^3$ .............................................. C04B 35/02
[52] U.S. Cl. ..................................... 501/124; 106/97; 106/104; 266/280
[58] Field of Search .................. 501/124; 106/97, 104; 266/280

[56] References Cited

U.S. PATENT DOCUMENTS

| | | | |
|---|---|---|---|
| 3,060,043 | 10/1962 | Renkey | 501/124 |
| 3,802,894 | 4/1974 | Prost | 501/124 |
| 4,111,711 | 9/1978 | Kiehl et al. | 106/97 |

*Primary Examiner*—James Poer
*Attorney, Agent, or Firm*—Kenyon & Kenyon

[57] ABSTRACT

A blast furnace having a refractory lining of concrete components each having a volume of at least 0.2 m$^3$, and comprising an alumina-containing cement or slag, chromium oxide of very fine particle size and fired aluminum oxide of somewhat larger particle size, together functioning as a cement for a refractory aggregate, provides great resistance to the heat and abrasive conditions existing inside of a blast furnace.

3 Claims, 3 Drawing Figures

BLAST FURNACE WITH A REFRACTORY LINING OF CONCRETE COMPONENTS

This is a continuation-in-part application of U.S. patent application Ser. No. 261,620, filed May 7, 1981, which in turn is a continuation-application of earlier filed U.S. patent application Ser. No. 103,426, filed Dec. 14, 1979, both now abandoned.

BACKGROUND OF THE INVENTION

The construction and operating conditions of a blast furnace are well known, but anyone uninformed can refer to Chapter 12 of The Making, Shaping and Treating of Steel, Seventh Edition, copyright 1957 by the United States Steel Corporation, which is hereby incorporated by reference in the following.

Usually a blast furnace is lined with fired bricks throughout its area receiving abuse from heat and abrasion, but when repairs are required, a refractory concrete, while moist and plastic, can be injected into the areas requiring repair, followed by drying and annealing of the concrete. The chemical compositions of two known concretes are as follows:

Mass A: $SiO_2$ 36.3%, $Al_2O_3$ 54.2%, $TiO_2$ 2.1%, $Fe_2O_3$ 1.3%, CaO 5.1%, $Na_2O$ 0.12%, $K_2O$ 0.27%, $P_2O_5$ 0.06%, annealing loss 0.43%.

Mass B: $SiO_2$ 6.1%, $Al_2O_3$ 81.5%, $TiO_2$ 2.2% $Fe_2O_3$ 1.8%, CaO 7.2%, $Na_2O$ 0.10%, $K_2O$ 0.04%, $P_2O_5$ 0.04%, annealing loss 0.67%.

The durability of such injected concrete lining masses is substantially less than that of the fired bricks, but concrete can be used for repairs. Refractory concrete can also be used as small volume masses in blast furnaces at the downcomer connections with the furnace's gas hood, for the installation of the bosh cooling plates, at the iron and cinder notches and at other locations.

However, although known refractory concretes have a high strength at room temperatures, during heating between 700° and 1100° C., depending on the type of cement, a zone of relatively low strength is formed which only achieves a high final strength when ceramic fusion of the concrete is attained. Because of this zone blast furnace lining concrete parts have been subject to a high degree of abrasion from the descending solids in the furnace whenever this zone of lower strength occurs.

For example, when the concrete parts have a volume of more than 0.2 m³, the inside towards the furnace heat is fused to a ceramic of high strength, whereas on the outside of the concrete parts somewhat away from the heating, a strength approaching the room temperature strength of the concrete prevails. That is to say, the concrete part is of high strength as to its inner and outer side portions but has the low strength zone between these high strength areas. The result is that under the furnace's operating conditions the concrete parts can tear apart under abrasion or impact.

Even during the drying of concrete parts when of relatively large volume have been known to become cracked or to disintegrate due to inner thermal stresses resulting from the drying heat.

Because of the foregoing knowledge of the disadvantages of refractory concrete when used as blast furnace lining parts of large volume, such as a volume greater than 0.2 m³, experienced blast furnace designers have considered refractory concrete to be unacceptable for such parts regardless of the possible advantage that it can be formed into finished parts prior to installation of the parts in the furnace lining construction. Concrete also has the advantage that it can be injected for the repair of the furnace lining brickwork, but only to provide masses of small volume as indicated.

Concretes using cement and aggregates of many compositions are known. All are resistant to heat and abrasion to some degree under some conditions, but in view of the long history of blast furnace lining technology, it would be surprising to find that any general purpose concrete could advantageously be used as replacement.

In the present instance, the object has been to provide a blast furnace having a refractory lining of concrete components each having a volume of at least 0.2 m³ and which is adequately resistant to the conditions existing inside of a blast furnace to permit its incorporation as a lining component for a furnace manufacturing pig iron, the concrete components being preformed prior to furnace lining installation, with a fixed shape and dimensions and which are in a condition for installation and satisfactory use as a part of the furnace lining.

DESCRIPTION OF THE INVENTION

The present invention achieves the above objectives by providing the blast furnace with a refractory lining of preformed concrete components having a volume greater than 0.2 m³ with a fixed shape and wherein the cement portion of the concrete consists of the following composition:

A. 10 to 30% by weight of a mineral alkaline earth compound selected from the class consisting of metallurgical slags containing calcium-mono-aluminate, calcium-di-aluminate and calcium-silico-aluminate, alumina-containing cements of the type calcium mono-aluminate and calcium di-aluminate, alumina-containing silicate cements, silicates of calcium or barium, and alkaline earth oxides selected from the class consisting of magnesium oxide, dolomite, calcium oxide and barium oxide;

B. 14 to 54% by weight of a compound selected from the class consisting of silicon oxide, chromium oxide, titanium dioxide, zirconium oxide and aluminum oxide having a particle size of from 100 Å to 0.1 μm;

C. 14 to 54% by weight of an inert filler material with a particle size of from 1 to 100 μm;

the sum of constituents B. and C. amounting to from 70 to 90% by weight.

To make the furnace lining component of the present invention, this cement is used to make a concrete consisting of from 10 to 30% of the cement and from 70 to 90% of an aggregate such as corundum. Enough moisture is used to make the concrete plastic so that it can be injected or compacted into a mold to form a furnace lining component of at least 0.2 m³ and often the size of the component would exceed 0.3 m³. After being formed to the desired component having the shape and dimensions required, the component is dried by heating and is preferably heated to temperatures of from 200° to 600° C. before building-up the lining out of the components.

When forming part of the furnace lining, such component does not have any zone of lowered strength in the temperature zone of from 700° C. to 1100° C., such as has characterized all prior known refractory concretes. The risk of cracks forming is very low when the component is heated and chipping on the hot inside of the component has never been observed during furnace operation conditions. The finished refractory concrete component has a resistance to the action of pig iron and alkaline slags corresponding to that of the high quality ceramic bricks used for a long time satisfactorily for blast furnace linings.

Finished blast furnace lining construction components of large size and predetermined dimensions and shape can be made outside of the furnace and installed as lining components during the construction of the blast furnace. The components can be made so accurately that they can be laid in dry form without using mortar, and if joints are involved, these can be tamped with the same refractory concrete so that the furnace lining is composed at the joints of the same material as the concrete refractory component and is practically free of joints. Very little water need be used to make the concrete suitable for such tamping so that very little water vapor is created when the furnace is placed in operation.

In view of the relatively great size of the finished construction components the assembly time is extremely short and the lining has few seams which is particularly advantageous as abrasion predominantly attacks the area of the seams.

Concrete using cement of the described composition has been proposed previously only for use in the building industry, for road surfacing, for containers for radioactive waste, for reinforced concrete constructions and for underwater constructions. (See German Offenlegungsschrift No. 27 31 612.)

For the above purposes the concretes have comprised from 10 to 30% of the described cement and from 70 to 90% of an aggregate, for example, corundum.

However, never before was such concrete known to be useful in any way in connection with blast furnace linings where temperatures of up to 1700° C. are encountered together with changes in temperature and where there is great risk of crack formation due to thermal stresses and chipping through the repeated impact effects of falling coke and ore, as well as the action of pig iron and slag.

The present inventor has surprisingly discovered that the finished components in larger size with a volume of at least 0.2 m³ made of the refractory concrete described, can be used in a blast furnace lining construction without the disadvantages which have previously made. Those skilled in the art of blast furnace design believe that concrete furnace lining components of such large dimensions cannot be used successfully.

The present invention provides its most surprising results in the way of satisfactory performance when the refractory concrete component of the large or larger size described is made by starting with the following dry mix concrete composition.

10 to 30% by weight of cement constituents consisting of
A. 10 to 30% by weight alumina-containing cement or alumina-containing slag,
B. 14 to 54% by weight chromium oxide with a particle size of between 100 Å and 0.1 μm,
C. 14 to 54% by weight fired aluminum oxide with a particle size of between 1 and 100 μm;

the sum of constituents B. and C. amounting to 70 to 90% by weight of the cement,
and 70 to 90% by weight of an aggregate of corundum.

Enough moisture is used to make the concrete injectable so that it satisfactorily fills a mold for preforming of the components. The components are then heated for drying, preferably being subjected to temperatures in the range of from 200° to 600° C. before components are used for building-up of the lining of the blast furnace.

BRIEF DESCRIPTION OF THE DRAWINGS

The accompanying drawings illustrate an example of a blast furnace according to the present invention.

DETAILED DESCRIPTION OF THE INVENTION

Figure 1:
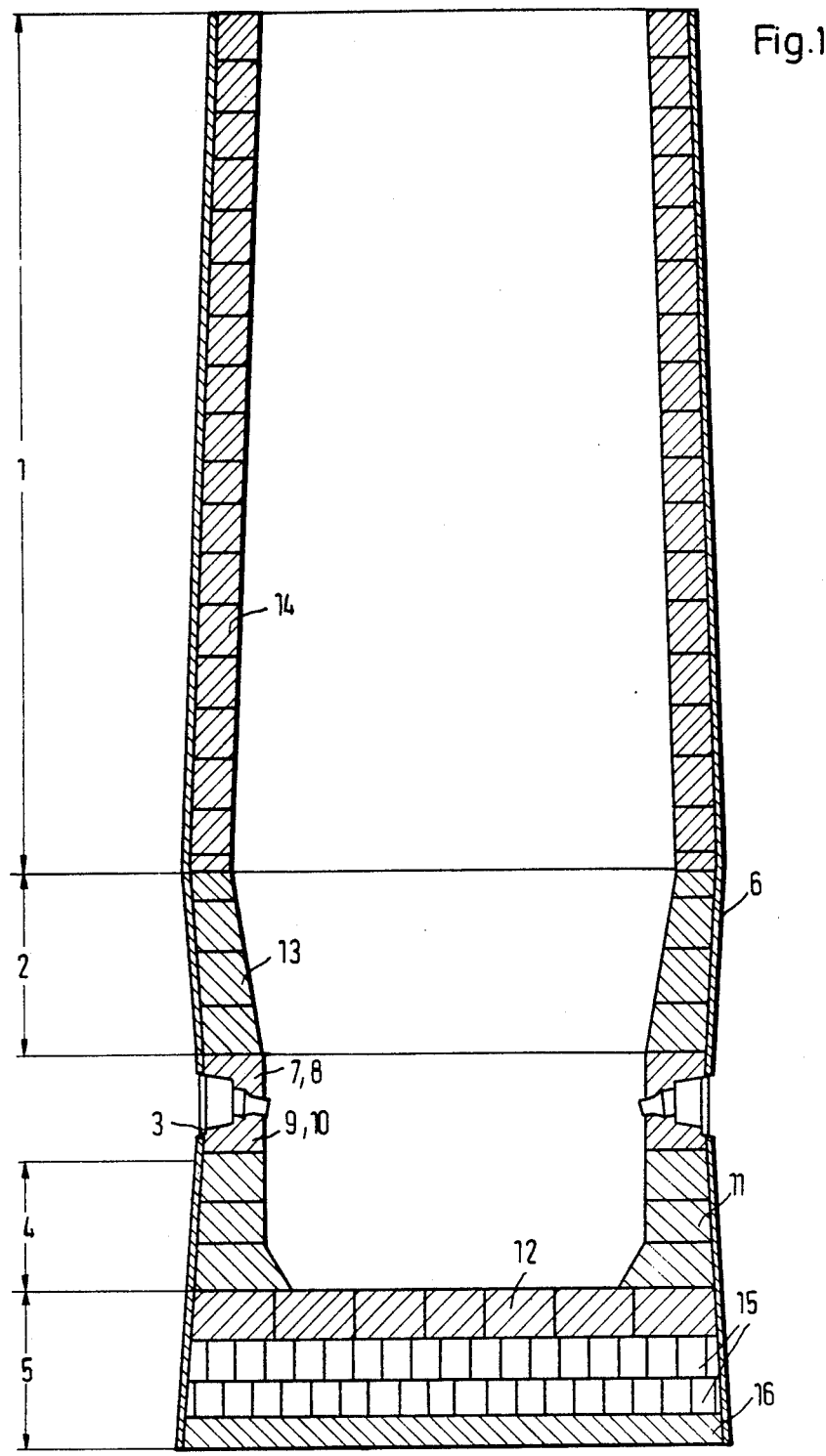
FIG. 1 is a longitudinal section of a blast furnace having a refractory lining built up by concrete components of large size.

FIG. 1 shows a blast furnace. 1 designates the stack, 2 the bosh, 3 the metallic tuyeres, 4 the hearth and 5 the bottom of the blast furnace. The lining is surrounded by the blast furnace steel jacket 6. The tuyere 3 is surrounded by the lining components 7 to 10 which are shown in greater scale in FIGS. 2 and 3.

The refractory concrete lining of the blast furnace is built-up by hearth lining components 11, the bottom lining components 12 which are supported by lower bottom layers 15, f.i. carbon bricks, and by the basic layer 16. The concrete components 13 are located at the bosh and the concrete components 14 at the stack of the blast furnace.

Figure 2:
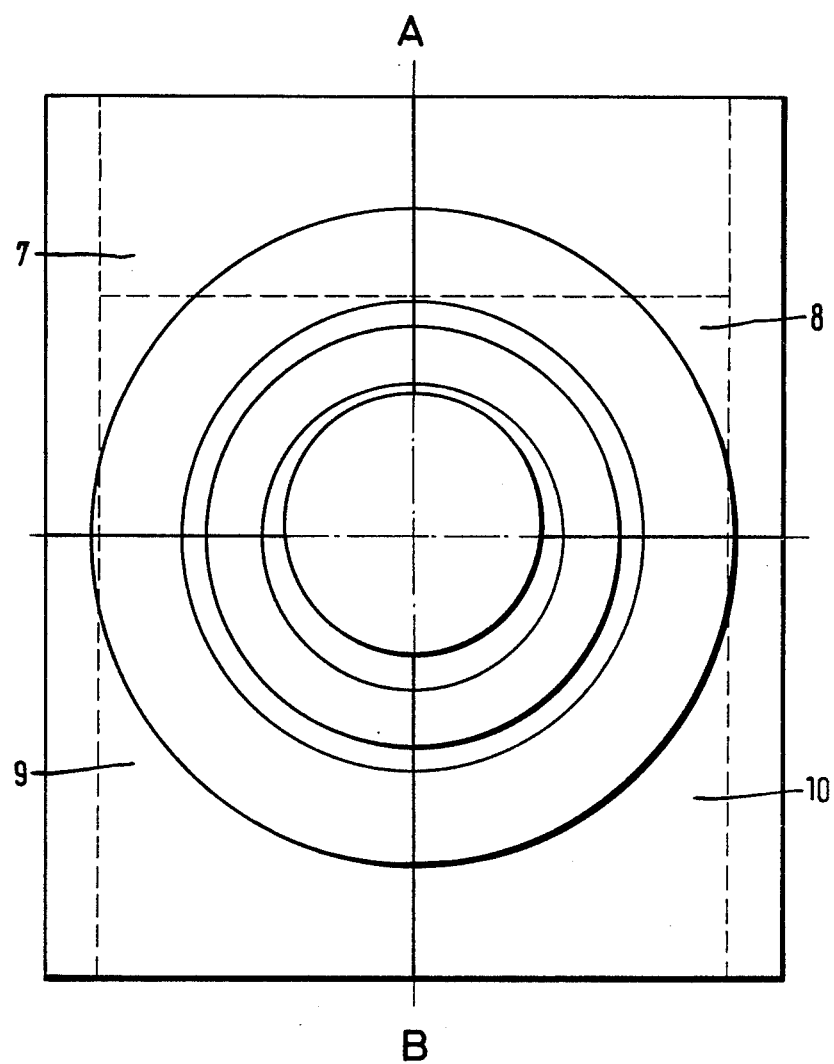
FIG. 2 is a front view of the assembly of parts and tuyere.
Figure 3:
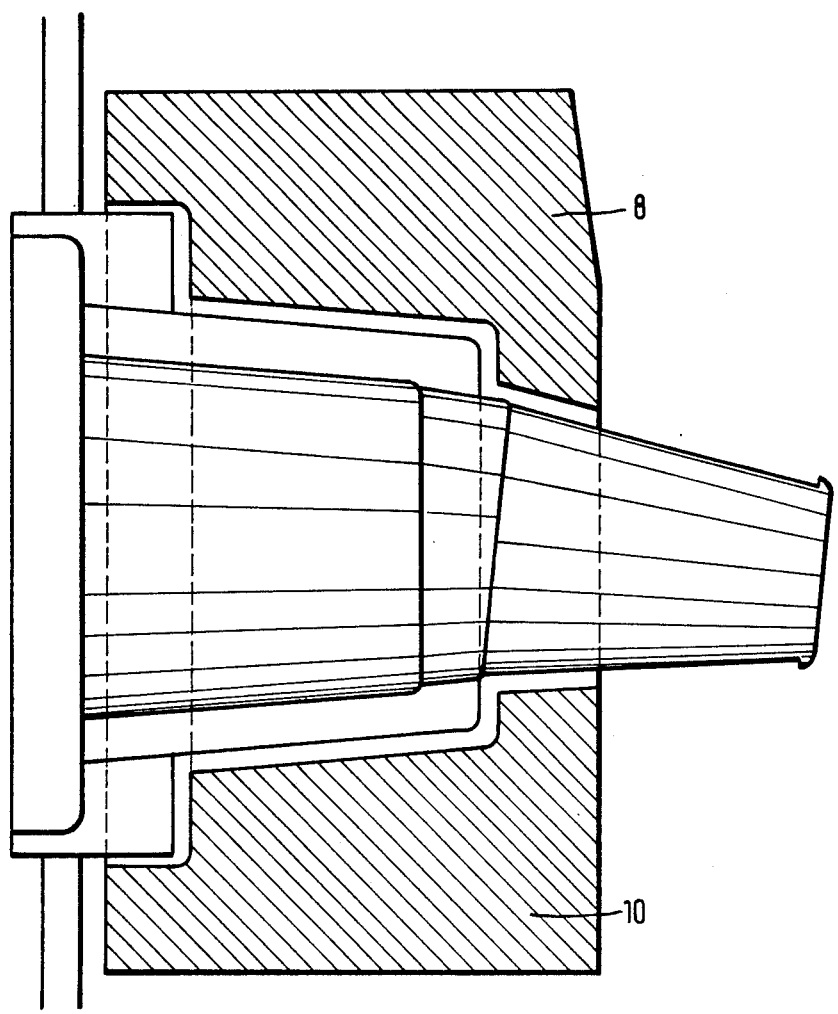
FIG. 3 is a cross section taken on the line A-B in FIG. 2.

The finished construction components 9 and 10 shown in FIGS. 2 and 3 each have a weight of 836 kg and each a volume of 0.238 m³. The two other finished construction components 7 and 8 each have a weight of 822 kg and each a volume of 0.234 m³.

The composition of the used refractory cement was:
A. 24% by weight alumina-containing cement with a particle size of 5 to 50 μm,
B. 47% by weight chromium oxide with a particle size of <0.1 μm,
C. 29% by weight fired aluminum oxide with a particle size of 1 to 10 μm.

19% by weight of this refractory cement was mixed with 81% by weight corundum and with 3.3% by weight water relative to the concrete dry mixture, and prepared as a concrete mass.

The corundum used had the following grain size gradation:
23% by weight grain size gradation 5 to 10 mm,
23% by weight grain size gradation 2 to 5 mm,
20% by weight grain size gradation 0.2 to 2 mm,
15% by weight grain size gradation 0.05 to 0.2 mm.

The chemical composition of the concrete was as follows:
$SiO_2$ 0.42%, $Al_2O_3$ 84.9%, $TiO_2$ 2.66%, $Fe_2O_3$ 0.12%, CaO 1.20%, $Na_2O$ 0.08%, $K_2O$ 0.02%, MgO 0.15%, $Cr_2O_3$ 8.9%, rest accompanying elements.

The prepared concrete mass was filled into forms corresponding to the aforementioned components 7 to 10 of the blast tuyere surround and compacted by means of jolting. After a setting time of 24 hours, the finished construction components were tempered in the range of 300° to 600° C. for approximately 8 days and then built into the furnace lining around the blast furnace tuyere 3.

Before the finished construction components were used in the blast furnace, test bodies were subjected on their front side, as in the blast furnace, to a temperature of 1400° C. which was produced with oxygen by way of a natural gas burner. The test bodies had a temperature of 50° C. on their rear side. No cracks could be found on the test parts after cooling nor could any chipping be discovered on their heated front side.

In order to check the abrasion behavior of the refractory concrete to be used according to the invention in the blast furnace towards attack by slag and pig iron, comparative tests were carried out in a rotatable drum type furnace. The drum type furnace, whose longitudinal axis had a 5% inclination, was equipped with a natural gas burner and means for metering slag and pig iron on its front wall and with a slag overflow on its rear wall. It was 1000 mm in length and 800 mm in diameter.

In a first test three different fired chrome-corundum bricks in standard format which contained
87.4% $Al_2O_3$ and 11.3% $Cr_2O_3$ (brick 1) or
91.7% $Al_2O_3$ and 7.2% $Cr_2O_3$ (brick 2) or
89.0% $Al_2O_3$ and 8.6% $Cr_2O_3$ (brick 3)
and unfired slabs 600×270×125 mm in dimension composed of the concrete of this example to be used according to the invention, were built into the drum type furnace. The dimensions of the concrete slabs for the abrasion tests were determined by the small size of the drum type furnace.

10 kg blast furnace slag and 25 kg pig iron were then charged in the lined drum type furnace (rotational speed: 1.5 r.p.m.). This charge was melted for one hour, and then 10 kg blast furnace slag was added each hour. The heating was carried out with the described natural gas burner. The heating temperature was 1500° C. The duration of the test amount to 86 hours.

The average abrasion amounted to 0.11, 0.15 and 0.20 mm/hr for the chromium-corundum bricks and 0.21 mm/hr for the refractory concrete slabs.

In a second test the drum type furnace was lined with three different fired corundum bricks in standard format which contained
89.4% $Al_2O_3$ and 9.5% $SiO_2$ (brick 4)
91.9% $Al_2O_3$ and 7.0% $SiO_2$ (brick 5)
92.3% $Al_2O_3$ and 7.0% $SiO_2$ (brick 6)

and with refractory concrete slabs corresponding to the first comparative test.

10 kg slag (composed of 90% blast furnace slag and 10% potash ($K_2CO_3$)) was then charged in the lined drum type furnace (rotational speed: 1.5 r.p.m.). This charge was melted for one hour, then 10 kg slag was added each hour which in turn was composed of 90% blast furnace slag and 10% potash. The heating was carried out with the described natural gas burner. The heating temperature was 1500° C.; the duration of the test 48 hours.

The average abrasion was found to be 1.1 and 0.8 mm/hr for bricks 4 to 6 and 0.22 mm/hr for the refractory concrete slabs.

The comparative tests show that the chemical abrasion of the unfired slabs composed of the refractory concrete to be used according to the invention, due to pig iron and slag, was only slightly greater than the abrasion of the examined chromium bricks, whereas the corundum bricks examined had a substantially greater abrasion.

What is claimed is:

1. A blast furnace having a refractory lining comprising preformed refractory concrete components each having a volume of at least 0.2 m³ with a fixed shape and wherein the cement portion of the concrete consists of the following:
   A. 10 to 30% by weight of a mineral alkaline earth compound selected from the class consisting of metallurgical slags containing calcium-monoaluminate, calcium-di-aluminate and calcium-silico-aluminate, alumina-containing cements of the type calcium mono-aluminate and calcium di-aluminate, alumina-containing silicate cements, silicates of calcium or barium, and alkaline earth oxides selected from the class consisting of magnesium oxide, dolomite, calcium oxide and barium oxide;
   B. 14 to 54% by weight of a compound selected from the class consisting of silicon oxide, chromium oxide, titanium dioxide, zirconium oxide and aluminum oxide having a particle size of from 100 Å to 0.1 μm;
   C. 14 to 54% by weight of an inert filler material with a particle size of from 1 and 100 μm;
   the sum of constituents B. and C. amounting to from 70 to 90% by weight 2. Blast furnace having a refractory lining built-up by components of concrete according to claim 1 in which said cement portion is from 10 to 30% by weight of said component and consists of:
   A. 10 to 30% by weight of said alumina-containing cement or said alumina-containing slag;
   B. 14 to 54% by weight of said chromium oxide;
   C. 14 to 54% by weight of said filler with the filler being fired aluminum oxide with a particle size of between 1 and 100 μm; the sum of constituents B. and C. amounting to 70 to 90% weight of the cement;
   and in which from 70 to 90% by weight is an aggregate consisting of corundum.

3. Blast furnace having a refractory lining built-up by components of claims 1 or 2 in which said components are formed with a fixed shaped and are then heated to temperatures of from 200° C. to 600° C.

* * * * *